(12) United States Patent
Redpath

(10) Patent No.: US 6,931,409 B2
(45) Date of Patent: Aug. 16, 2005

(54) METHOD, APPARATUS, AND PROGRAM TO EFFICIENTLY SERIALIZE OBJECTS

(75) Inventor: Richard J. Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 10/040,826

(22) Filed: Jan. 8, 2002

(65) Prior Publication Data

US 2003/0131010 A1 Jul. 10, 2003

(51) Int. Cl.⁷ .......................... G06F 17/00; G06F 15/16; G06F 9/44
(52) U.S. Cl. ...................... 707/100; 707/103; 717/108; 709/203
(58) Field of Search .............................. 707/1, 10, 100, 707/101, 102, 103 R–2, 104.1; 717/108; 709/203

(56) References Cited

U.S. PATENT DOCUMENTS

| | | | |
|---|---|---|---|
| 4,249,241 A | 2/1981 | Aberle et al. | 364/200 |
| 5,857,197 A | 1/1999 | Mullins | 707/103 |
| 5,944,781 A | 8/1999 | Murray | 709/202 |
| 5,995,098 A | 11/1999 | Okada et al. | 345/331 |
| 6,035,303 A | 3/2000 | Baer et al. | 707/103 |
| 6,085,198 A | 7/2000 | Skinner et al. | 707/103 |
| 6,154,747 A | 11/2000 | Hunt | 707/100 |
| 6,212,556 B1 | 4/2001 | Arunachalam | 709/219 |
| 6,233,601 B1 | 5/2001 | Walsh | 709/202 |
| 2002/0178297 A1 * | 11/2002 | Lister et al. | 709/310 |
| 2003/0172020 A1 * | 9/2003 | Davies et al. | 705/36 |

* cited by examiner

*Primary Examiner*—Alford W. Kindred
(74) *Attorney, Agent, or Firm*—Duke W. Yee; A. Bruce Clay; Stephen R. Tkacs

(57) ABSTRACT

A mechanism is provided for efficiently serializing complex objects. When a server application returns a complex object, the server application creates a string object. String objects are already defined as serializable. The string object may simply be a hash key in a hash table for the server application, which stores the complex object. Thus, the complex object does not have to be inefficiently serialized, because the string is returned rather than the complex object. The client may then use the complex object to call another server application without knowing the structure of the complex object.

11 Claims, 3 Drawing Sheets

METHOD, APPARATUS, AND PROGRAM TO EFFICIENTLY SERIALIZE OBJECTS

RELATED APPLICATIONS

The present application is related to commonly assigned and co-pending U.S. patent application Ser. No. 09/919,235 entitled "METHOD, APPARATUS, AND PROGRAM FOR CHAINING MACHINE TRANSLATION ENGINES TO CONTROL ERROR PROPAGATION", filed on Jul. 31, 2001, and U.S. patent application Ser. No. 09/919,257 entitled "METHOD, APPARATUS, AND PROGRAM FOR CHAINING SERVER APPLICATIONS", filed on Jul. 31, 2001, and hereby incorporated by reference.

BACKGROUND OF THE INVENTION

1. Field of the Invention

The present invention relates to data processing systems and, in particular, to object oriented programs. Still more particularly, the present invention provides a method, apparatus, and program to efficiently serialize objects.

2. Background of the Invention

When data is passed between a client and a server in a network, the data must be serialized. Serialization is a process of converting an object's state into a stream of bytes that can later be used to reconstruct an identical copy of the original object. Some data types, such as an integer or text string, are easily serializable. However, complex data must undergo a specific serialization process. When an objects is serialized into a string, the object class must also know how to turn that string to an instance of the object class.

There may be times when serialization of a complex object is not efficient. For example, a first server application may return a complex object to a client, which uses the complex object to invoke a second server application. However, the client may not know the structure of the object to deserialize the object upon receipt and serialize the object to send it back to the server. Furthermore, deserializing the object only to serialize the object and send it to the same server is inefficient.

Therefore, it would be advantageous to provide a more efficient way to serialize an object created by a server and used by a client.

SUMMARY OF THE INVENTION

The present invention provides a mechanism for efficiently serializing complex objects. When a server application returns a complex object, the server application creates a string object. String objects are already defined as serializable. The string object may simply be a hash key in a hash table for the server application, which stores the complex object. Thus, the complex object does not have to be inefficiently serialized, because the string is returned rather than the complex object. The client may then use the complex object to call another server application without knowing the structure of the complex object.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
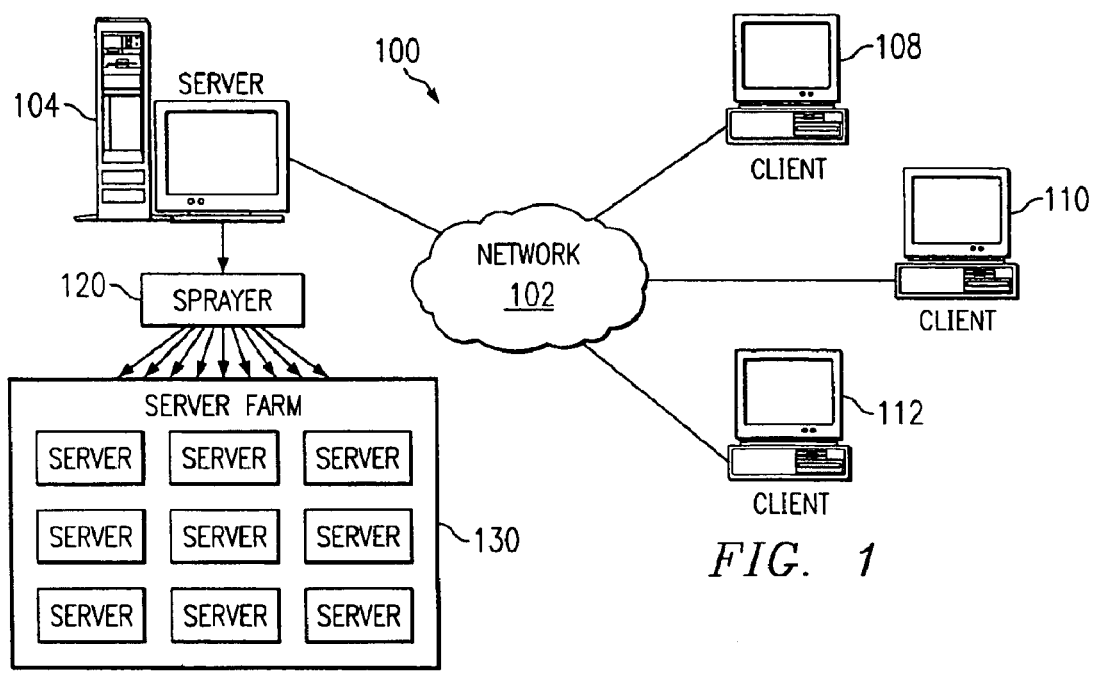
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102. In addition, clients 108, 110, and 112 are connected to network 102. These clients 108, 110, and 112 may be, for example, personal computers or network computers. In the depicted example, server 104 provides data, such as documents, to clients 108–112. In a specific example, server 104 may be a Web server.

Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

To provide service on a scalable range server farm 130 may be used. Server 104 may direct requests from clients to one of the servers in server farm 130 through sprayer 120. The sprayer distributes requests to one of the servers in the server farm and may perform other functions, such as load balancing. Each server in the server farm may run all the available applications. For example, each server may run a German-to-English translation, an English-to-Spanish translation, and a verification application for verifying whether the requesting client is authorized to access each application.

Figure 2:
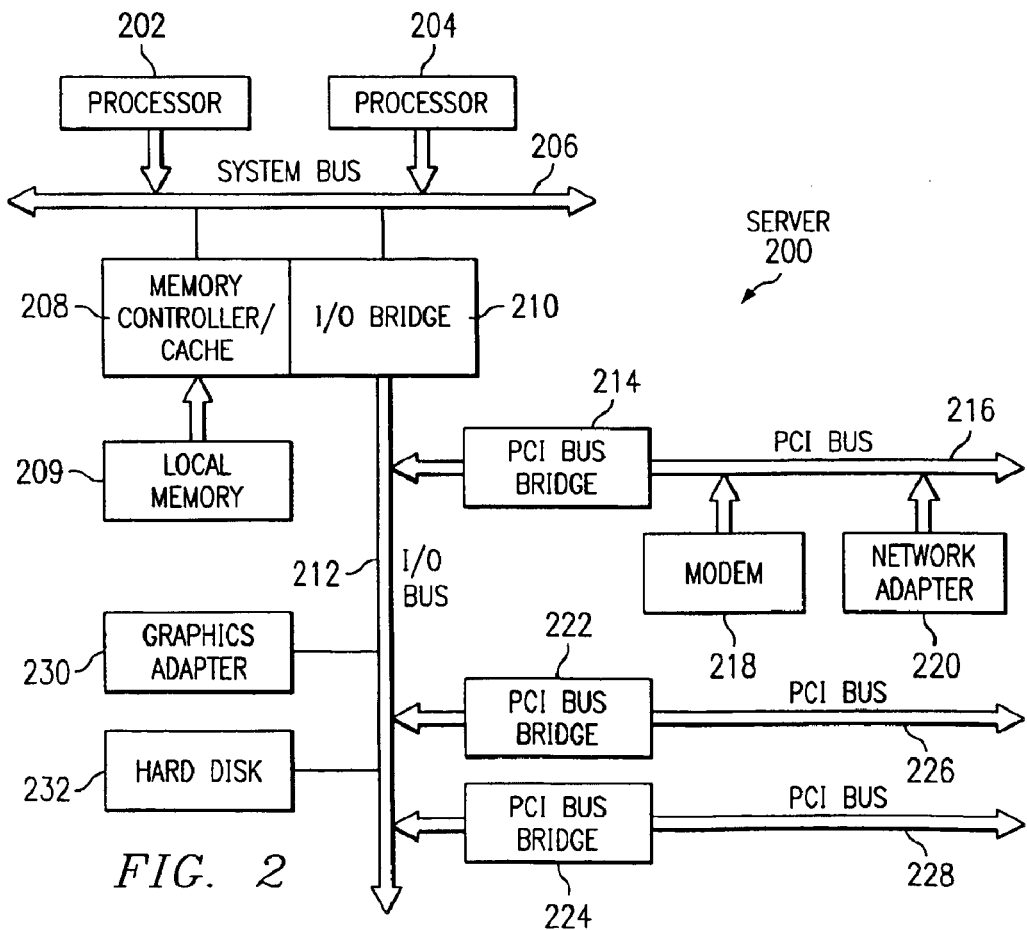
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
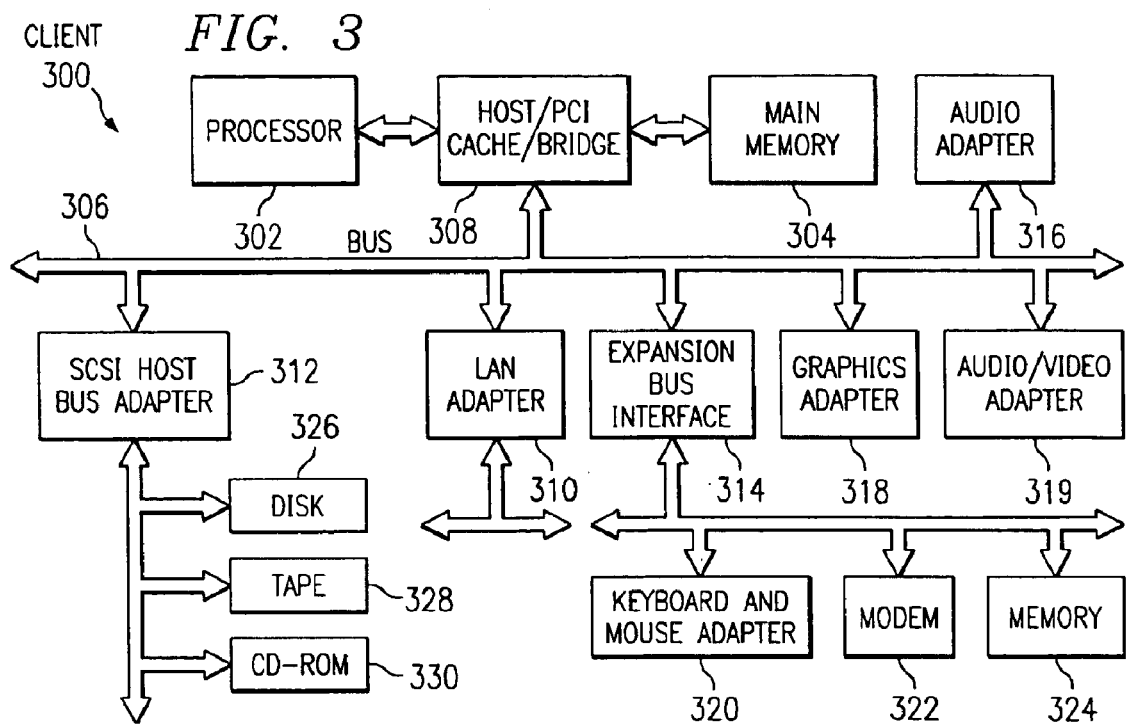
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance. Returning to FIG. 1, each server in server farm 130 may include all the server applications. When a new server application is developed, the application must be added to every server in the server farm. Furthermore, a new application may be developed that is to be used with one or more of the existing applications. For example, a supplier may develop a customer verification application that receives a customer number and determine if the customer is authorized to use a given server application. The new customer verification application may be added to each of the existing server applications. However, to modify each existing server application to be chained with another application may be cumbersome, particularly considering the potentially large number of servers in a server farm.

Figure 4:
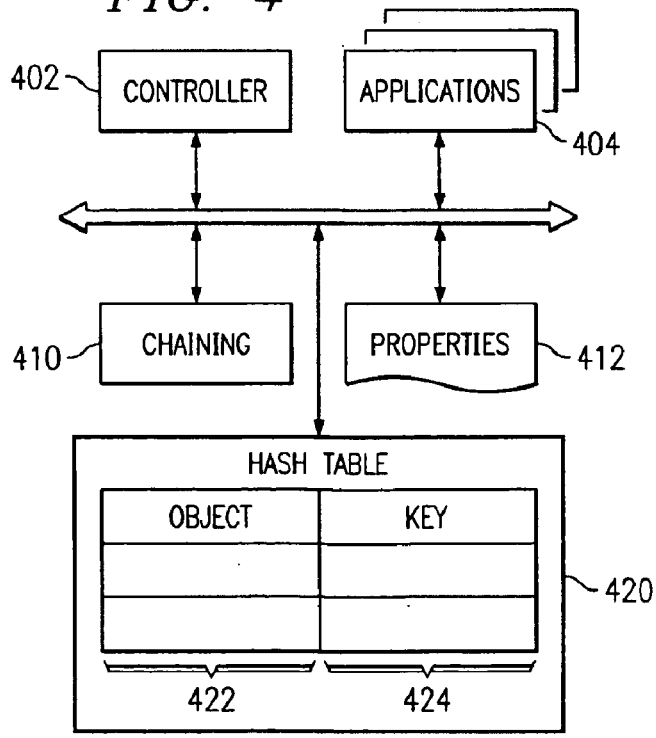
FIG. 4 is a block diagram illustrating the functional components of a server in accordance with a preferred embodiment of the present invention.

In accordance with a preferred embodiment of the present invention, a chaining module is provided that receives a series of server applications and chains them together passing the output of one to the input of the next. The series of server applications may be passed to the chaining module in a chain option. A properties file may be provided to register names of server applications. A name may be associated with the chaining module and the options may be specified in the properties file. Thus, a chain of server applications may be registered by name. With reference to FIG. 4, a block diagram illustrating the functional components of a server is shown in accordance with a preferred embodiment of the present invention. The server includes a controller 402 and applications 404. The controller controls the execution of applications 404. Applications 404 may provide services, such as machine translation, that are provided by the server. Applications may be used in conjunction with one another. For example, one application may provide a machine translation service that translates text from a source language to a target language. Another application may provide a statistics service that counts the number of words in the target language text. The server also includes chaining module 410. The chaining module allows applications to be used together without requiring modification of the existing applications for passing the output of one application to the input of the next application in the chain. For example, to call a German (Deutsche (de)) to English (en) translation engine (deen) chained with an English to French (fr) translation engine (enfr), a client may simply call the chain module to chain deen and enfr. The server may also include properties 412. Each of applications 404 and the chaining module 410 are registered in the properties file by establishing a name and associating an application to the name. A provider may also register a chain of applications in properties 412 by establishing a name and associating the chain module to that name setting the chain of applications to be chained using a chain option recognized by the chaining module. Properties 412 may be embodied as a file stored on the server.

In accordance with a preferred embodiment of the present invention, when one of applications 404 returns a complex object, chaining module 410 creates a string object that is a hash key. Hash table 420 stores the object 422 and the key 424. The key is returned in place of the object because the key is a string object, which is efficiently serializable. The string is unique, because it is simply the address of the object in the hash table.

Vendors may use this technique in native implementations of applications 404 to return a string object as the handle. When another application is called, hash table 420 is used to retrieve the object based on the key. The client may then use the string object to call another one of applications 404 without knowing the structure of the transaction handle. The chaining engine may also be written without knowing the structure of every possible complex object returned by applications 404.

The functional components illustrated in FIG. 4 may be embodied in hardware, software, or a combination of hardware and software. For example, controller 402 may be a processor, such as processors 202, 204 in FIG. 2, and applications 404 and chaining module 410 may be software executing on the processor. The functional components of the server may also be implemented as firmware.

Figure 5:
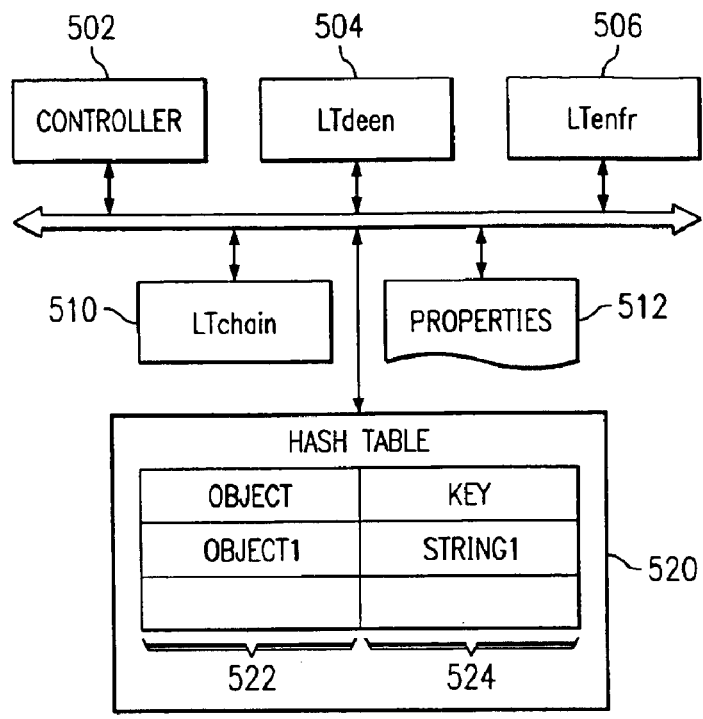
FIG. 5 depicts the functional components of a specific example of a server in accordance with a preferred embodiment of the present invention.

FIG. 5 depicts the functional components of a specific example of a server in accordance with a preferred embodiment of the present invention. The server includes a controller 502, language translation engine LTdeen 504, and language translation engine LTenfr 506. LTdeen provides a machine translation service that translates text from German (Deutsche (de)) to English (en). LTenfr provides a machine translation service that translates text from English to French (fr). The server also includes chaining engine (LTchain) 510. The chaining module allows applications to be used together without requiring specific code for passing the output of one application to the input of the next application in the chain.

The server also includes properties 512. A new service may be registered by establishing a name and associating the chaining module to the name in properties 512. For example, a German to French translation engine may be registered using the text "Provider.defr=address.LTchain" and setting the chaining options using the text "Provider.defr.options= *chain=deen,enfr."

If LTdeen and LTenfr are chained together to produce a German to French translation engine, then the chaining engine must return a complex object "object1" that is the handle indicating the engines to chain. Therefore, the chain function must create a string "key1" and place the key and the complex object in the hash table. The translate function must then use the key to retrieve the complex object from the hash table.

Figure 6:
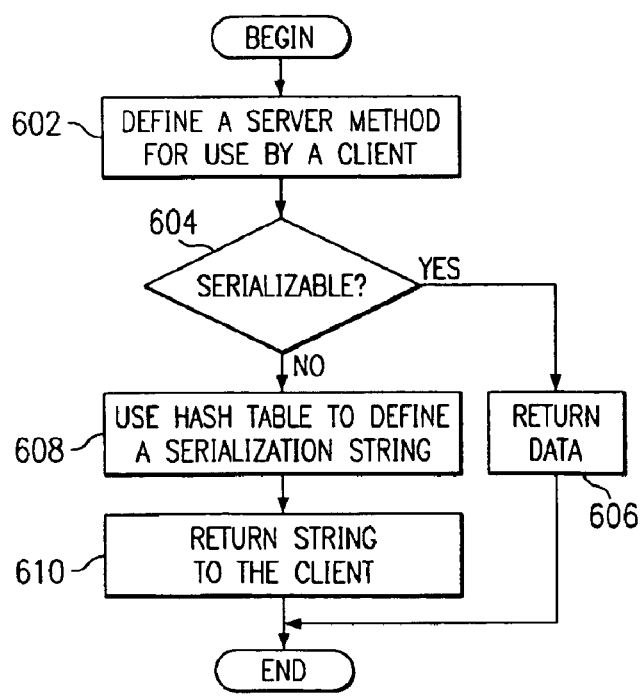
FIG. 6 is a flowchart illustrating the operation of a server application that returns a complex object in accordance with a preferred embodiment of the present invention.

With reference to FIG. 6, a flowchart illustrating the operation of a server application that returns a complex object is depicted in accordance with a preferred embodiment of the present invention. The process begins and defines a server method for use by a client (step 602). A determination is made as to whether an object returned by the method is serializable (step 604). If the object is serializable, the process returns the data (step 606) and ends.

If the object is not serializable in step 604, the process uses a hash table to define a serialization string (step 608). Thereafter, the process returns the string to the client (step 610) and ends.

Figure 7:
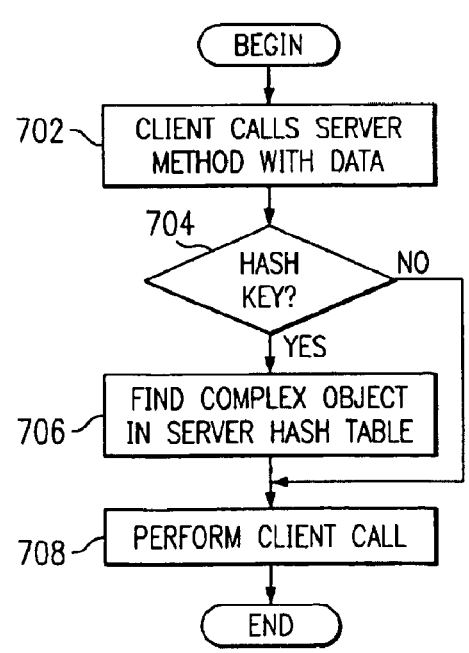
FIG. 7, a flowchart is shown illustrating the operation of a server application that is being called by a client in accordance with a preferred embodiment of the present invention.

Turning now to FIG. 7, a flowchart is shown illustrating the operation of a server application that is being called by a client in accordance with a preferred embodiment of the present invention. The process begins and the client calls a server method with data (step 702). A determination is made as to whether the data is a hash key (step 704).

If the data is a hash key, the process finds the complex object in the server hash table using the hash key (step 706). Thereafter, the process performs the client call (step 708) and ends. If the data is not a hash key in step 704, the process proceeds to step 708 to perform the client call and ends.

Thus, the present invention solves the disadvantages of the prior art by providing a mechanism for efficiently serializing complex objects. When a server application returns a complex object, the server application creates a string object. String objects are already defined as serializable. The string object may simply be a hash key in a hash table for the server application, which stores the complex object. Thus, the complex object does not have to be inefficiently serialized, because a short string is returned rather than the complex object. The client may then use the complex object to call another server application without knowing the structure of the complex object. Functions such as chaining may be written without knowing the underlying format of complex objects. Furthermore, complicated code for serialization of complex objects is unnecessary to enable functions such as chaining or other new functions.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a server, comprising:

receiving data from a server application;

determining whether the data is serializable;

storing the data in a data structure and forwarding, to a client, a reference to the data structure if the data is not serializable;

receiving argument data from a client;

determining whether the argument data is a reference to a complex object; and retrieving the complex object from the data structure if the argument data is a reference to a complex object.

2. The method of claim 1, wherein the argument data comprises an argument in a server application call.

3. The method of claim 2, further comprising:

passing the complex object as the argument in the server application call.

4. The method of claim 1, wherein the data structure comprises a hash table.

5. The method of claim 4, wherein the reference to the data structure comprises a hash key.

6. An apparatus in a server, comprising:

first receipt means for receiving data from a server application;

first determination means for determining whether the data is serializable; and storage means for storing the data in a data structure and forwarding, to a client, a reference to the data structure if the data is not serializable;

second receipt means for receiving argument data from a client;

second determination means for determining whether the argument data is a reference to a complex object; and means for retrieving the complex object from the data structure if the argument data is a reference to a complex object.

7. The apparatus claim 6, wherein the argument data comprises an argument in a server application call.

8. The apparatus of claim 7, further comprising:

means for passing the complex object as the argument in the server application call.

9. The apparatus of claim 6, wherein the data structure comprises a hash table.

10. The apparatus of claim 9, wherein the reference to the data structure comprises a hash key.

11. A computer program product, in a computer readable medium, comprising:

instructions for receiving data from a server application;

instructions for determining whether the data is serializable;

instructions for storing the data in a data structure and forwarding, to a client, a reference to the data structure if the data is not serializable;

instructions for receiving argument data from a client;

instructions for determining whether the argument data is a reference to a complex object; and instructions for retrieving the complex object from the data structure if the argument data is a reference to a complex object.

* * * * *